United States Patent [19]

Lutz

[11] 3,952,887
[45] Apr. 27, 1976

[54] VEHICLE LOADING AND UNLOADING APPARATUS

[76] Inventor: David Edward Lutz, 330 Washington Lane, Carlisle, Pa. 17013

[22] Filed: Apr. 16, 1974

[21] Appl. No.: 461,467

[52] U.S. Cl. .............................. 214/38 C; 198/218; 214/38 BA; 296/28 M
[51] Int. Cl.² ...................................... B65G 67/02
[58] Field of Search ............... 214/38 C, 38 CC, 41, 214/44 R, 516, 38 BA; 296/28 M; 105/370–372, 422; 198/218

[56] References Cited
UNITED STATES PATENTS

| | | | |
|---|---|---|---|
| 2,428,144 | 9/1947 | Clough | 105/422 X |
| 3,337,066 | 8/1967 | Reed et al. | 214/38 C |
| 3,420,193 | 1/1969 | Austgen | 105/422 |
| 3,454,173 | 7/1969 | Martin | 214/38 C |
| 3,526,331 | 9/1970 | Marshall et al. | 214/516 X |
| 3,664,533 | 5/1972 | Hand | 214/516 |
| 3,727,777 | 4/1973 | Hanson | 214/41 |
| 3,780,893 | 12/1973 | Lassig et al. | 214/41 X |

Primary Examiner—Robert G. Sheridan
Attorney, Agent, or Firm—Edward E. Dyson

[57] ABSTRACT

Vehicle loading and unloading apparatus comprising a longitudinally extensible element having pallet load supporting rollers and ground-engaging rollers. Power drive means moves the extensible element under restrained pallet loads, spaced from the supporting floor by supporting beams or pallet feet, to wedge the loads upwardly and off of its supporting means. With the loads supported on the load supporting rollers, the extensible element is retracted to remove the entire load from the vehicle. In loading, loads are placed on the rollers and the extensible element is extended into the vehicle. The load is then restrained while the frame is withdrawn from beneath the loads, as a wedge would be withdrawn, to allow the loads to rest on supporting means within the vehicle.

14 Claims, 23 Drawing Figures

VEHICLE LOADING AND UNLOADING APPARATUS

BACKGROUND OF THE INVENTION

This invention relates to article handling mechanisms and more particularly to apparatus for loading and unloading vehicles.

There are many mechanized systems in the prior art which were developed in an attempt to provide an inexpensive yet durable means for loading and unloading vehicles. Those systems coming the closest to this invention comprise an extensible conveyor section which is extended from a point outside of a vehicle, perhaps on a loading dock, into the interior of the vehicle and beneath a load which is supported in spaced relationship to the floor of the vehicle. Lifting means are then actuated to raise the section to engage the underside of the load and to lift the load off of the floor, at which time the section is retracted to remove the load to the loading dock.

SUMMARY OF THE INVENTION

Those prior art devices mentioned above, in addition to being developed for limited applicability, are quite complicated in structure and expensive to build in comparison to the subject invention. Briefly, the invention of this application is operable with palletized loads or similar loads which are spaced from the floor of the vehicle either by feet or stringers which form an integral part of the pallet while allowing slots for fork lifts and for the apparatus of this invention, or by stringers or load-supporting beams mounted on the floor of the vehicle. To unload a vehicle onto a dock when the apparatus of this invention is mounted on the loading dock, the invention is extensible into the vehicle and beneath the palletized loads. The upper portion of the extensible element is provided with load-supporting rollers, and the extensible element itself rides on the lower rollers which roll on the floor of the vehicle. When used to wedge under a load, the height of the extensible element of the apparatus of this invention is slightly greater than the distance between the floor of the vehicle and the undersurface of the pallet load, and is tapered at its forward end. Therefore, as the extensible element is extended under the palletized loads, which are generally aligned in a pair of rows in the vehicle, the loads are lifted upwardly and off of the floor through what might be termed a wedging action. This wedging action, of course, is facilitated by the tapered leading edge of the extensible element which may or may not be equipped with rollers on one or more surfaces. The palletized loads are restrained from movement in the direction of movement of the extensible element by the forward wall or other bulwark mounted on the vehicle. The apparatus is made to conform to the size of the load-carrying portion of the vehicle such that an entire truckload may be removed at one time. After the extensible element has reached its maximum limit, the entire load will be resting on the load-supporting rollers on the upper surface of the extensible element. Suitable stop or friction means are provided to retain the loads in a stable position on the element as the entire element is then retracted back onto the loading dock carrying the loads with it. Hence the entire truck is unloaded through one extending movement of the apparatus of this invention and one retracting movement.

The above describes the function of the apparatus of the vehicle with respect to the unloading of a vehicle. When it is desired to load a vehicle, palletized loads or other similar loads are placed on the rollers of the extensible element when it is in its retracted position on the dock. It might be mentioned at this time that other conventional conveyor elements may be connected to the apparatus of this invention leading from the interior of a warehouse, for example, to the loading dock, or the loads can be placed directly onto the apparatus of this invention by a forklift truck, or the like. After being fully loaded and the appropriate stops activated and in place to keep the load from shifting on the rollers, the extensible element is then extended bodily into the vehicle. Again, rollers are provided on the underside of the element and first ride on a supporting base which may be permanently mounted on the dock, and then on ramps which extend from the dock onto the floor of the vehicle and then finally on the floor of the vehicle. After the load and the extensible element are fully within the vehicle, a suitable load restrainer such as a bar is placed across the rear opening of the vehicle. Alternatively, a blocking bar may be attached pivotally or swingably to the loading dock for movement to a restraining position. The loads are then gently "unwedged" and are lowered either onto supporting beams in the vehicle, or onto the floor of the vehicle. The extensible element is retracted much as a tablecloth can be pulled out from beneath a set of dishes on a table in that well-known, time-worn trick. This action is, of course, facilitated by the antifrictional function of the load-supporting rollers and the floor-engaging rollers. Upon retraction of the extensible element, the operation is complete and, again, the truck has been loaded in only two movements of the apparatus.

Numerous other embodiments and adaptations are discussed in this application pertaining to the general operation of the apparatus as described above. For example, embodiments of retractable stringers or supporting beams for the floor of the vehicle or the dock are disclosed, such that the truck may be used in other operations where only forklift loaders are available and must enter the vehicle. Further, a preferred form of drive means is shown and disclosed in this application, however, it is to be understood that it is within the scope of this invention to utilize a number of different drive means other than those disclosed herein without departing from the scope of this invention. Further, the apparatus can be mounted within a vehicle as opposed to on a loading dock. The operation is substantially the same in either case.

With the foregoing in mind, it is a primary objective of this invention to provide an apparatus which can load and unload a vehicle in one operational cycle.

It is a further objective of this invention to provide an apparatus for loading and unloading vehicles which is relatively uncomplicated in structure, inexpensive to manufacture and durable in operation.

It is a further objective of this invention to provide an apparatus for loading and unloading a vehicle which may be mounted within a vehicle without modification thereto, or, in the alternative, may be mounted on a loading dock. In any event, the operation whether the apparatus is mounted on a vehicle or a loading dock is substantially identical.

It is a further objective of this invention to provide an extensible element in a load-handling device for movement from a loading dock to the interior of a vehicle or vice versa which is relatively flexible in that it is comprised of a series of longitudinally aligned, pivoted sections, therefore rendering the device adaptable to irregular surfaces in the path between the initial starting point to the loading or unloading position.

It is a further objective of this invention to provide, in conjunction with the loading and unloading apparatus of this invention, retractable pallet load supporting stringers which may be mounted either on the loading dock or on a vehicle, the purpose of the stringers being to support flat-bottomed pallet loads or other loads in spaced relationship to the floor.

These and other objects of the invention will become more apparent to those skilled in the art by reference to the following detailed description when viewed in light of the accompanying drawings wherein:

GENERAL

Figure 1A:
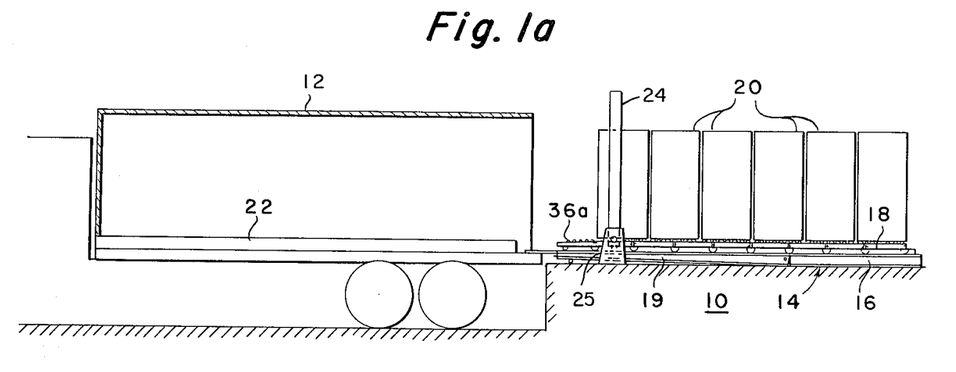
FIGS. 1a through 1c diagrammatically illustrate the operation of the loading and unloading apparatus of this invention when positioned on a loading dock.
Figure 1B:
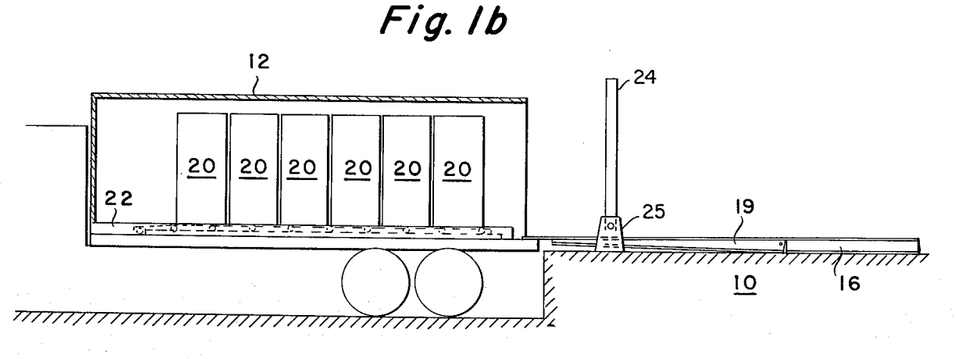
Figure 1C:
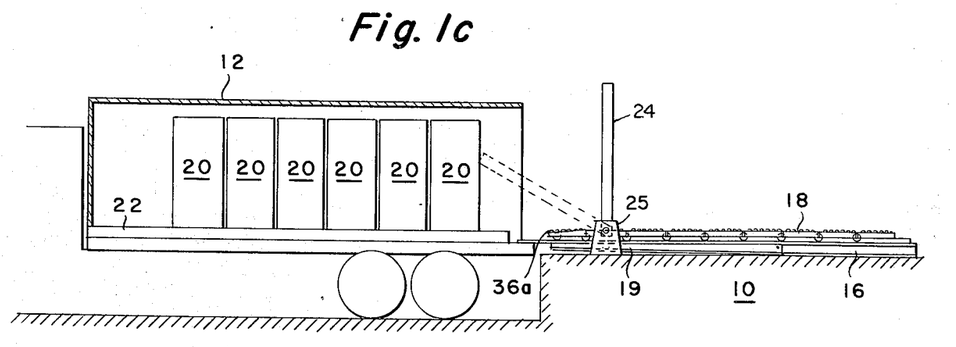

The operation of this invention can best be illustrated in a general manner at the outset with reference to FIGS. 1a through 1c and FIGS. 14a through 14c. FIGS. 1a through 1c illustrate the operation of the loading and unloading apparatus of this invention when the apparatus is positioned on a loading dock. A loading dock is schematically illustrated, in the drawings and is designated by the numeral 10. A vehicle such as the trailer of a tractor-trailer rig is indicated by the numeral 12 and is backed up to the loading dock 10. The loading and unloading apparatus of this invention is generally indicated by the numeral 14 and includes a stationary base 16 which is affixed to the loading dock and an extensible member 18 which rides on the base 16 and is extensible into the vehicle 12. Palletized loads 20 are supported on the extensible element 18.

With reference to FIG. 1a, the palletized loads 20 are in position to be loaded onto the vehicle 12. As will be explained in detail below, the upper surface of the extensible element 18 is provided with rollers and the loads 20 rest on the rollers. Stop means are provided on the extensible element on each end of the row of palletized loads 20 to maintain them in position on the extensible element 18. Through suitable power means, the extensible element is extended into the vehicle 20 to the position shown in FIG. 1b. In other words, the entire load is moved bodily along with the extensible element into the vehicle. The vehicle in a preferred embodiment is provided with load-supporting beams 22 for the purpose of supporting flat-bottomed pallets. It is to be understood that in alternate embodiments, pallets provided with stringers or feet sufficiently spaced to permit the insertion therebeneath of the extensible element 18 may be used. When in the position shown in FIG. 1b, the bottom surface of the palletized loads is slightly above the upper surfaces of the beams 22 in that the height of the extensible element 18 is slightly greater than that of the beams 22. As shown in FIG. 1c a rear load restrainer 24 which is mounted on the dock is pivoted downwardly to engage the rear of the row of loads 20. Other stop means may be employed such as a bar which is simply positioned in brackets across the rear of the truck. The purpose of the restraining means is to keep the loads from moving rearwardly as the extensible element 18 is withdrawn from beneath the loads. The extensible element 18 rides on rollers which engage the beams and then the floor of the vehicle, and, as mentioned earlier, the upper surface is provided with rollers upon which the loads rest. Therefore, as the element 18 is retracted as shown n FIG. 1c, it is retracted much like removing a wedge and the loads are gently lowered onto the supporting means 22

To unload the vehicle, the operation is reversed. Referring to FIG. 1c, the load restrainer 24 is moved to the inoperative solid line position while the extensible element is extended into the vehicle as shown in FIG. 1b. The extensible element wedges itself beneath the load and actually lifts the load off of the supporting beams 22 during its forward movement. This is facilitated by the roller surfaces and a tapered leading edge 36a. The loads, of course, are restrained from forward movement as the element 18 is moved into the vehicle either by the front wall of the vehicle or other suitable restraining means in the truck. After the element 18 is fully extended and is beneath the loads, stop means on the front end thereof are activated to prevent the loads from rolling off of the element 18 while it is retracted to the position shown in FIG. 1a, wherein the truck is shown fully unloaded.

Figure 14A:
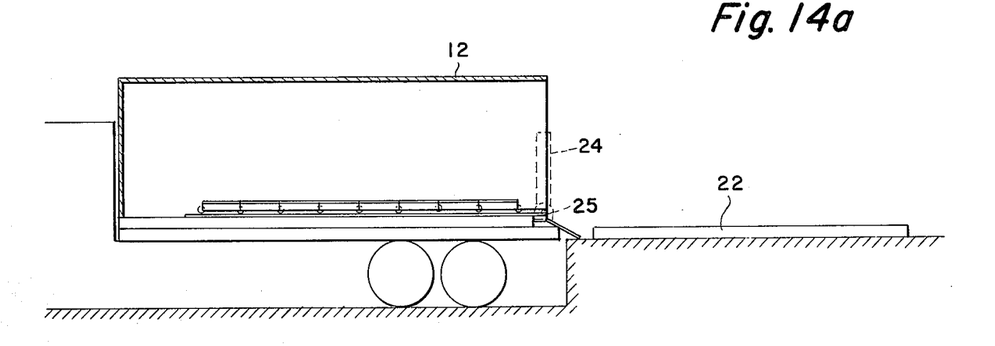
FIGS. 14a through 14c diagrammatically illustrate the loading and unloading functions of the apparatus of this invention when positioned in a vehicle.
Figure 14B:
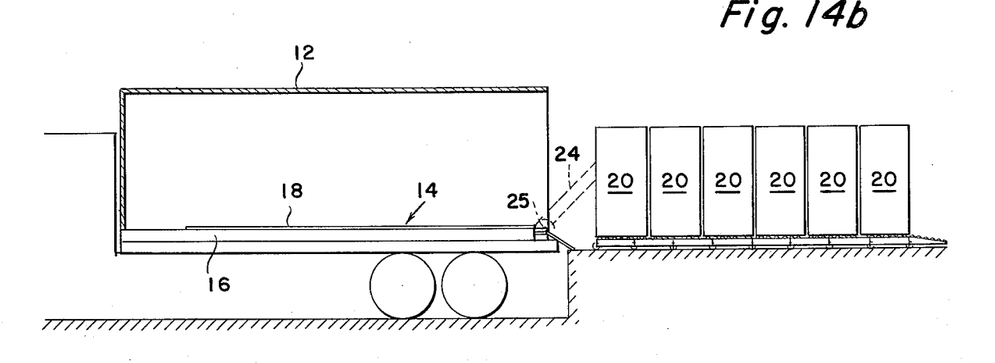
Figure 14C:
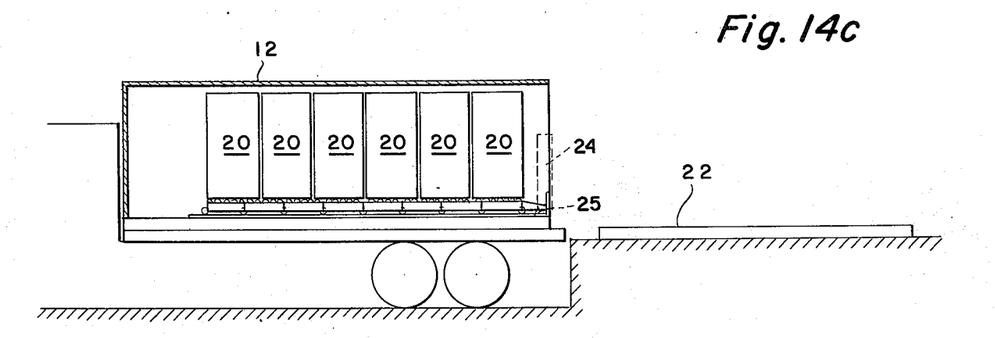

FIGS. 14a through 14c schematically illustrate the operation of the loading and unloading apparatus of this invention when it is mounted in a vehicle. The operation is substantially identical to that of FIGS. 1a through 1c with the only significant difference being that restraining means must be provided which act in the opposite directions due to the reversal of parts. We will now proceed with the detailed discussion of various elements of this invention.

EXTENSIBLE ELEMENT AND BASE

Figure 2:
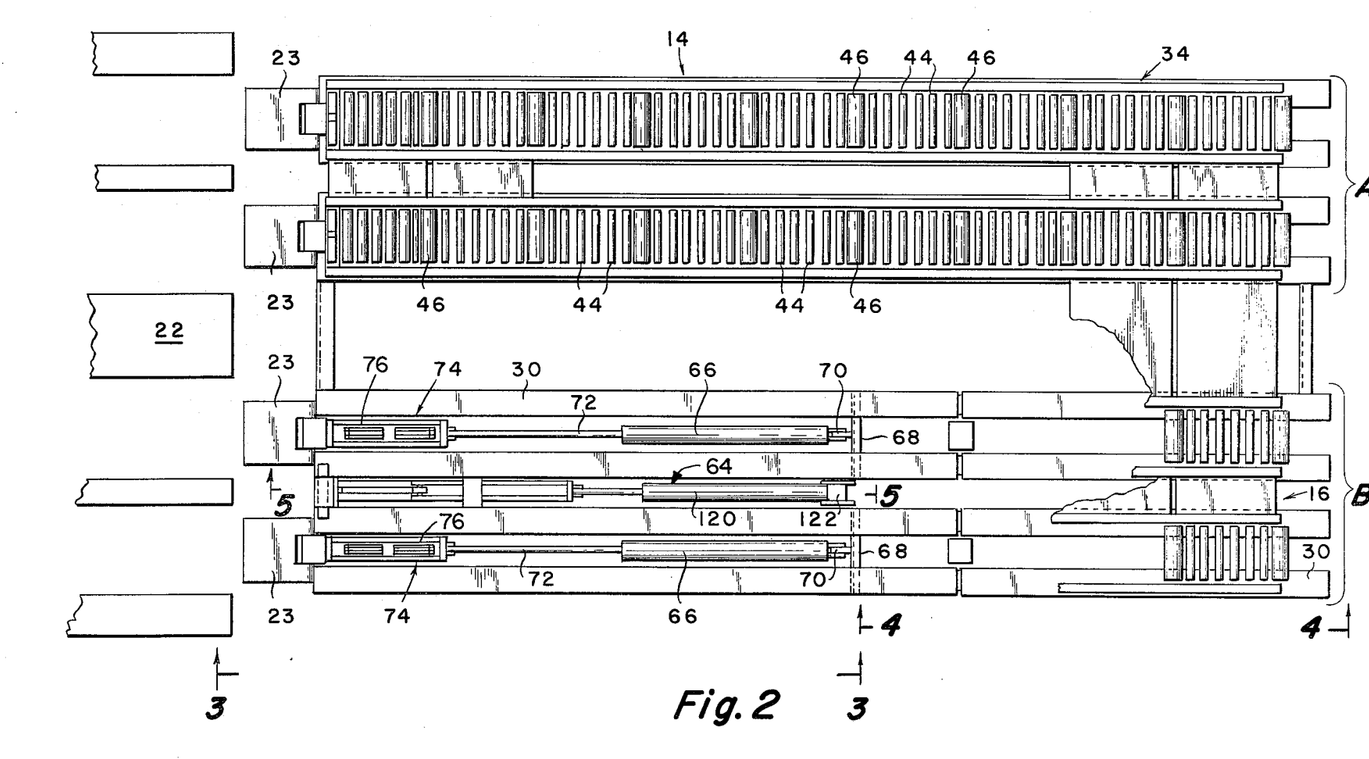
FIG. 2 is a plan view of the loading and unloading apparatus of this invention.
Figure 6:
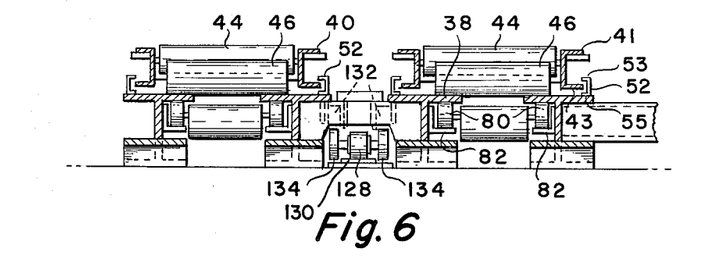
FIG. 6 is a view taken along lines 6—6 of FIG. 3.
Figure 7:
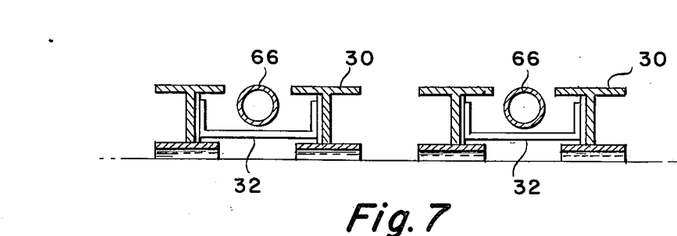
FIG. 7 is a view taken along lines 7—7 of FIG. 3.

The framework and structural arrangement of the base and extensible element can best be understood with reference to FIGS. 2, 3, 4, 6, 7, 11 and 12. With reference to FIG. 2, the base member 16 of the loading and unloading apparatus 14 comprises a plurality of I beams 30 arranged in side by side relationship as best seen in FIGS. 6 and 7. The complete unit shown in FIG. 2, which can load and unload two rows of pallets in a standard size tractor-trailer truck at the same time, is provided with eight of the beams 30 arranged in four pairs. The beams of each pair are joined together by suitable transverse brackets 32. The beams, of course, are fixed in a stationary manner to the loading dock or, in the alternative embodiments to the floor of the vehicle. With reference to FIG. 2, it can be seen that the pairs of beams which form the base are themselves grouped into two pairs, A and B, each of which provides the supporting base for the loading and unloading apparatus of a single row of pallet loads to be placed or unloaded from a vehicle. The sections A and B are joined together laterally by suitable structural means spanning the distance therebetween and properly spacing them to conform to the size of the vehicle and the spacing of rows in which the loads are to be placed.

Riding on the base are two pairs of roller strings 34 which together comprise the extensible element 18 of the loading and unloading apparatus of this invention. Four roller strings are provided and, with reference to FIGS. 3 and 4, each comprises a plurality of sections 36 longitudinally aligned and pivoted to each other at 38 much like a link chain. The sections in a preferred embodiment are approximately 3 ft. in length and are comprised of channel bars 40 which are joined together by means of transverse inverted T bars 42. The channel bars are best illustrated in FIG. 6. It is to be understood that each of the roller strings are identical and a description of one will serve the purpose of describing the others. The main point to keep in mind is that all of the strings are generally operated in unison as a single extensible element during the loading function; however, they are grouped in pairs A and B for purposes of supporting a single row of load and can be operated on a single row basis (involving one pair of roller strings) by providing separate drive means for each pair. It is to be understood that instead of a pair of roller strings, a single string utilizing rollers of sufficient length may be utilized. It has been found that it is more practical to use a pair of strings having short-length rollers which provide a more steady and unbending support for the loads.

Load-supporting rollers 44 are journaled in the channel beams 40 of each of the sections 36 and extend slightly above the surface of the channels 40 to provide a load-supporting surface. That is, the loads are at all times directly supported on the freely rotating rollers 44. A second set of rollers which may be referred to as ground-engaging rollers or lower rollers 46 are provided at the pivotal junctures 38 of each of the sections 36. These rollers, as best been in FIG. 6, ride on the upper surfaces 48 of the I beams 30 which comprise the base 16, and, when in the vehicle, ride on the floor of the vehicle. In this manner, the extensible element is movably supported by the rollers during this movement off of the base and into the vehicle and back again.

The roller strings are comprised of pivotally connected sections in the manner shown, as opposed to providing a non-articulated, rigid extensible member, to conform to the undulations or surface irregularities in the path of travel from the supporting base to the vehicle. In order to keep the roller strings from buckling as they are forced under the loads in the manner to be described below, restraining channel beams 52 are provided on each side of each roller string 34. The channel beams 40 have upper and lower legs 41 and 43 which extend laterally and away from the roller strings. The restraining channel beams 52 likewise have upper and lower legs 53 and 55. The channels 52 are so spaced relative to the roller strings that the upper legs 53 overlie the lower legs 43 of the channels 40 and thereby prevent the roller strings from buckling or moving upwardly to any substantial degree relative to the supporting base. After the element 18 leaves the base and is forced under the loads, the weight of the loads prevents buckling. These restraining channel beams 52 also serve as guides.

Figure 3:
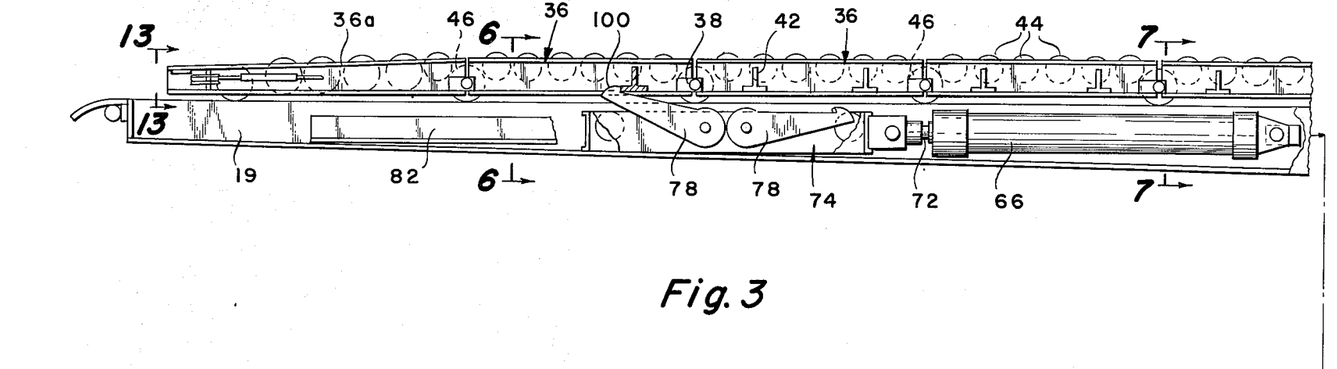
FIG. 3 is a view taken along lines 3—3 of FIG. 2.

The leading or frontmost section 36a of each roller string is tapered as shown in FIG. 3 and the rollers therein are so positioned to define a tapered surface and to provide a wedge for facilitating the forcing or insertion of the roller strings beneath loads as the extensible element is extended into the vehicle.

Figure 4:
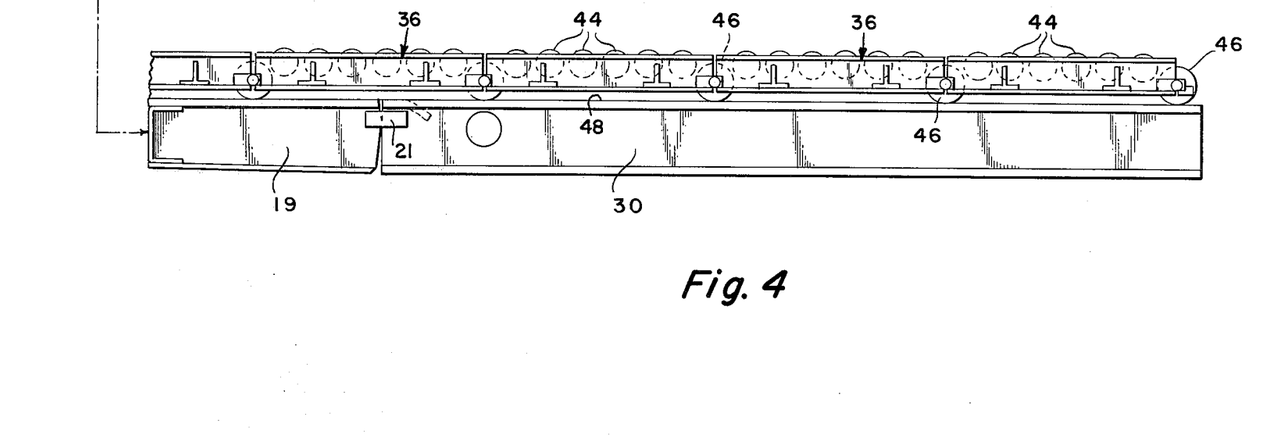
FIG. 4 is a view taken along lines 4—4 of FIG. 2.

As will be described in greater detail below, the base is provided with a forward section 19 which is pivotally connected at 21 to the I beams which comprise the supporting base. Power means generally indicated by the numeral 64 raises and lowers the forward section 19 relative to the base and the supporting dock to compensate for variances in height of the truck floor of the vehicle to be loaded or unloaded relative to the loading dock. This feature will be described in greater detail below.

DRIVE MEANS

Figure 8:
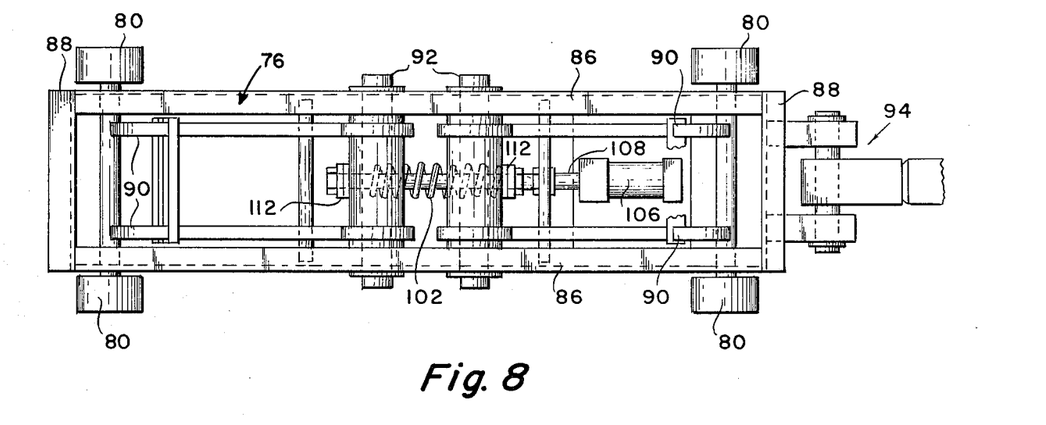
FIG. 8 is a plan view of the gripping elements used to advance the extensible element of the loading and unloading apparatus of this invention.
Figure 9:
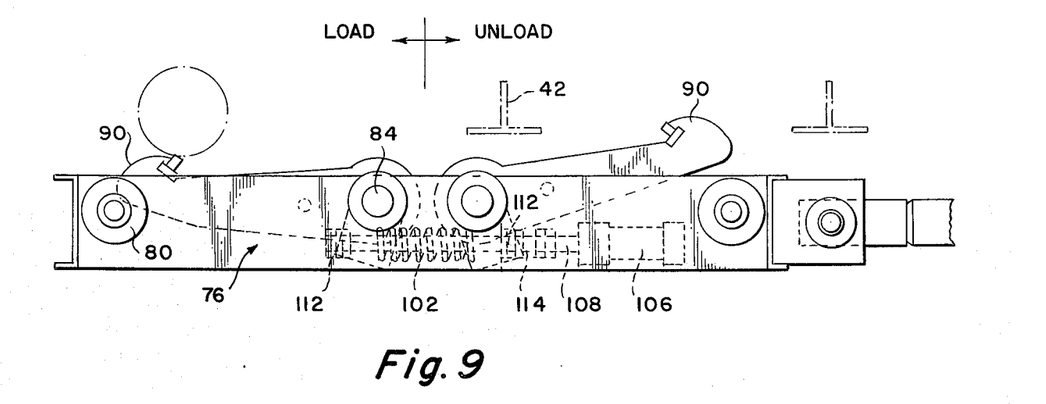
FIG. 9 is a side view in elevation of the gripping element of FIG. 8.
Figure 10:
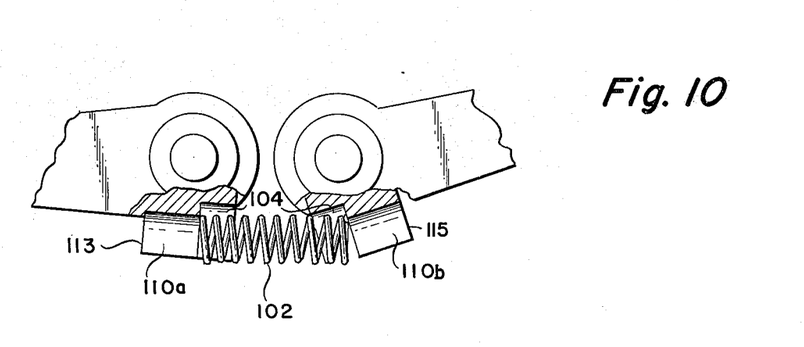
FIG. 10 is a fragmentary side view in elevation of a portion of the gripping element of FIGS. 8 and 9 showing, in particular, the position of the spring means which tends to urge the dogs of the gripper element to a predetermined position.
Figure 11:
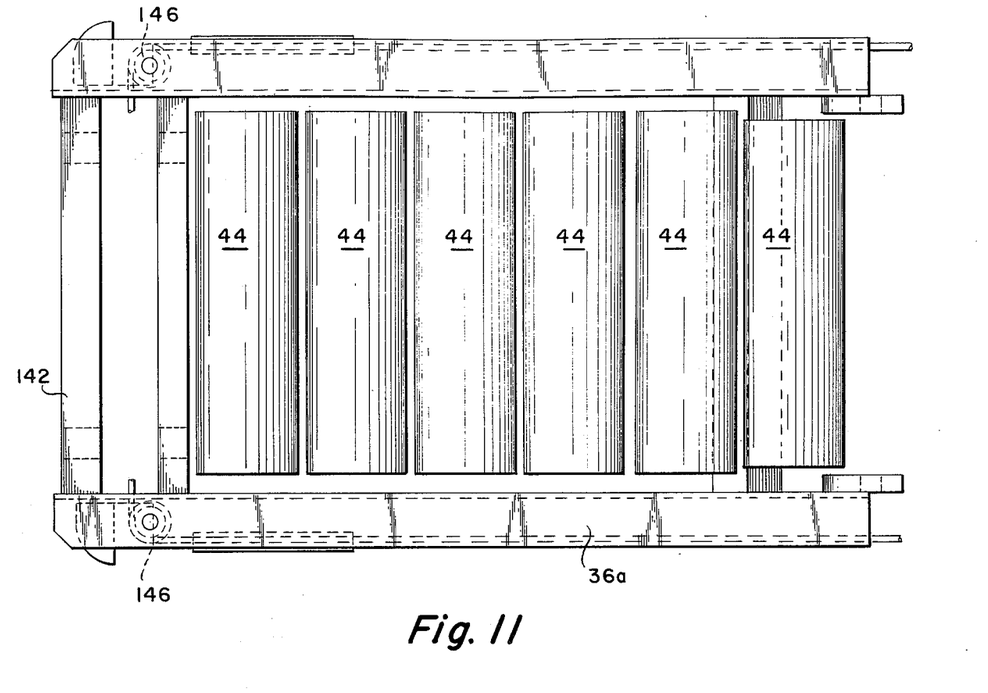
FIG. 11 is a plan view of the leading edge of one of the roller strings of the extensible element of this invention.
Figure 12:
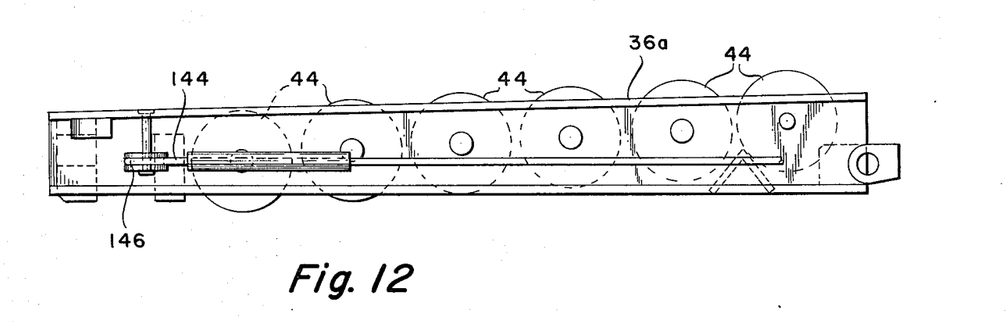
FIG. 12 is a side view in elevation of the member shown in FIG. 11.

Each of the pairs A and B is provided with identical drive means; therefore, a description of one will describe the other. With reference to FIG. 2, a pair of hydraulic cylinders 66 are pivotally attached at their rearwardmost ends to stationary transversely extending beams 68 by means of pivotal connections 70. The fluid connections for the cylinders are not shown, however, it is to be understood that they are conventional in the art and suitable conduits, pumps and other control means may be employed to perform the functions intended in this invention. Essentially the cylinders 66 are cyclically operated to alternately expand and contract the piston rods 72 continuously, to intermittently move the extensible element 18 into the vehicle. Gripping means 74 are attached to the leading ends of the piston rods 72 and engage the underside of the respective roller strings to either extend or retract the roller strings in an intermittent fashion. The gripping means are shown in greater detail in FIGS. 3 and 8 through 10. Each comprises a carriage 76 in which two dogs 78 are pivotally mounted on horizontal axes. The carriage is provided with rollers 80 which, as best seen in FIG. 6, ride on channel beams 82 welded to the interior faces of opposed walls of a pair of supporting I beams 30, which comprise the base. The carriage 76 is rectangular in configuration, and as best seen in FIG. 8, comprises side walls 86 and end walls 88. The dogs 78 are identical in construction and comprise body portions having hooked outer ends 90. The dogs are pivoted by pivot pins 92 which extend between the side walls of the carriage. The carriages are connected to the piston rods by pivotal connections 94. As shown in FIGS. 3 and 9, the hooked end of the dogs 78 are designed to engage the transverse bars 42 of each of the roller strings 34. The operation of the roller strings is rendered bidirectional simply by raising one or the other of dogs into operative engagement with the beams 42. For example, the position shown in FIG. 3, the dog in the left of the drawing is in the upward or operative position while the dog on the right is in the inoperative position. Accordingly, as the cylinder 66 is extended, there will be no movement of the roller string, in that the curved leading portion 100 of the dogs will cause the dogs to pivot downwardly and skip the transverse bars 42. However, as the cylinder is retracted, the dog will engage one of the transverse bars 42 in the manner shown to retract the roller string, or move it to the right as seen in FIG. 3, one stroke length. When the dog on the right is in the operative and when the cylinder is extended, the roller strings will be extended. The dogs are normally urged to the up or operative position by means of a coil spring 102 which is positioned in suitable notched-out portions 104 of the pair off dogs 78 as best seen in FIG. 10. The operating means for the dogs comprises a small hydraulic cylinder 106 having a piston rod 108 which extends through longitudinal notches 110a and 110b and the spring 102, and is provided with a nut or other stop 112 on its outer end. A similar stop 114 is provided between the first dog and the cylinder. Hence, by extending and retracting the piston rod 108 one or the other of the dogs is permitted to move to the operative position. For example, in FIG. 9, the cylinder 106 is shown in the retracted position with the stop 112 engaging the outer surfaces 113 that define the notch 110a in the leftmost dog. The position of the stop is such that the dog is pulled to the downward or inoperative position, while the location of the stop 114 relative to the outer surface 115 of the walls defining the notch 110b is such that the rightmost dog is permitted to move to the operative position. When the piston rod 108 of the cylinder 106 is extended, the stop 114 forces the rightmost dog downwardly as seen in FIG. 9 while the movement of the stop 112 to the left permits the leftmost dog to move to the up position. In the manner described above, the roller string can be intermittently extended retracted. It is to be understood that in the preferred embodiment and as shown in FIG. 2, each roller string has a drive means as just described and that preferably all drive means, four in all, can be operated in unison. It is to be understood that pairs of guide means for each row A or B are operated in unison.

HEIGHT ADJUSTMENT MEANS

Figure 5:
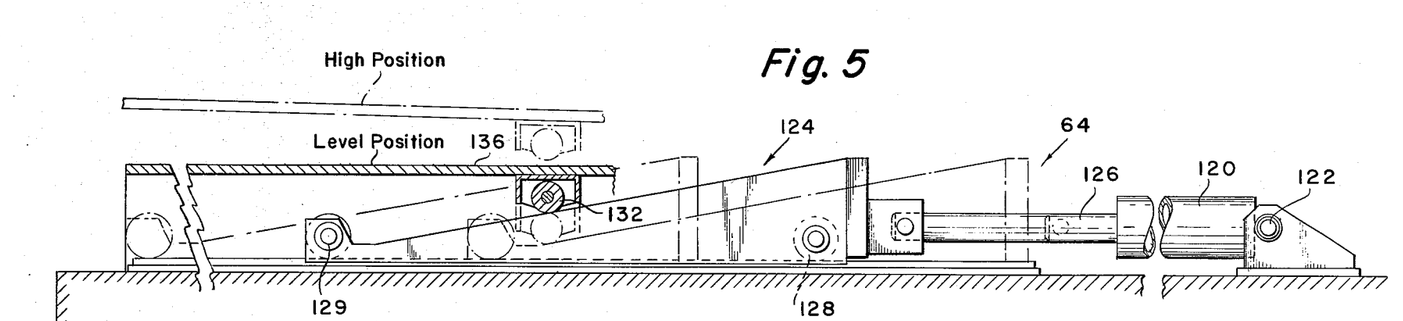
FIG. 5 is a view taken along lines 5—5 of FIG. 2.

As mentioned earlier, the forward end of the loading and unloading apparatus of this invention is vertically adjustable to compensate for variances between the height of the floor of the vehicle and the loading dock. This is accomplished by means of a hydraulic cylinder power means 120 which is pivotally connected to the loading dock at 122 and which is disposed between adjacent roller strings in each pair A and B as best seen in FIG. 2. A tapered carriage 124 is attached to the outer end of piston rod 126 and is supported by rollers 128 on a track 130 which is attached to the loading dock. The carriage 124 comprises a pair of side wall elements 134 whose tapered upper surfaces function as cams and engage a pair of rollers 132 which are journaled on the underside of a transversely extending supporting plate 136. The transversely supporting plate is affixed to adjacent I beams which underlie adjacent roller strings in a pair in the manner shown in FIG. 6. The entire lifting apparatus, of course, is operably connected to that earlier described pivotal portion 19 of the base 16 which is partially shown in FIGS. 3 and 4. Accordingly, as the cylinder 120 is extended to move the carriage 124 from the dotted line position as shown in FIG. 5 to the full line position, the pivotal section 19 supports a pair of roller strings and is forced to move toward the dotted line "high" position as shown in FIG. 5. In other words, a single lifting means lifts the leading sections of the underlying supporting base for a pair of roller strings which comprises one of the pairs A or B.

LOAD RESTRAINING AND STOP MEANS

Figure 13:
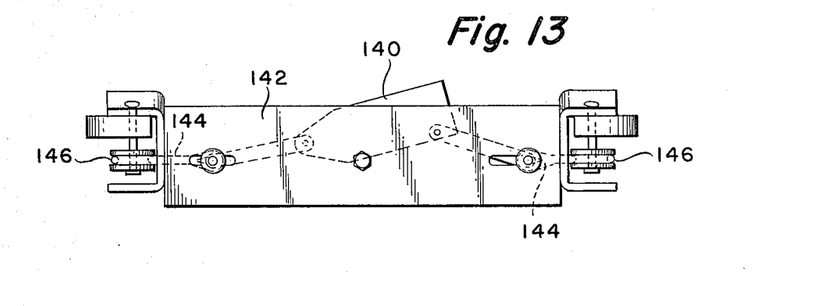
FIG. 13 is a front view in elevation of the leading edge of one of the roller strings of the extensible element.

As mentioned earlier, the load is at all times supported on freely rotating rollers on the extensible element 18, hence when loads are bodily shifted from one position to another through movements of the extensible element, means must be provided to prevent the loads from rolling off. Accordingly, with reference to FIGS. 11 through 13, stop means are positioned on the forward end of each of the roller strings in the form of a lug 140 which is pivotally mounted on the forward wall 142 of each of the roller strings, and which is pivoted to the up, or operative, position and the down, or inoperative, position, by means of a cable 144 which is attached to opposite sides of the element 140 and which extends around pulleys 146 and through suitable guide means, not shown, to the rear of the loading and unloading apparatus of this invention. By shifting the cable, the stop can be caused to pivot to the up or operative position or to the down or inoperative position. In operation, assuming that the vehicle is to be unloaded, the stop 140 will be moved to the operative position after the extensible element has been wedged under a load and is about to be retracted to bodily remove the load. A similar stop is on the rear end of each roller string.

Further, as mentioned earlier, restraining means are required to be mounted either on the dock or on the vehicle to prevent the load from moving back out with the conveyor when it is desired to remove the extensible element from beneath the load to permit the load to come to rest on the static supports 22. Any suitable means may be employed for performing this function. One of the simplest comprises placing a bar which is placed in suitable brackets across the rear of the vehicle much like one would place a bar across a door. Brackets may be positioned in the side walls of the vehicle at spaced points to compensate for less than full loads.

Another embodiment is shown in FIGS. 1a through 1c and comprise a swinging brace 24 which is pivotally mounted in supports 25 affixed to the loading dock. As shown, the brace 24 can be privoted downwardly to engage the load to prevent its reward movement as the extensible element is withdrawn.

OPERATION

Without going into great detail with respect to the operation of each element of this invention, it is desirable to provide an overview of the operation. Assuming that it is desired to load a vehicle, palletized loads are placed on the roller strings with a pair of roller strings generally supporting a single row of palletized loads, as explained earlier. The loads can be placed on the roller strings either by forklift trucks or it is contemplated that conventional conveyors from within the warehouse can be connected to the loading or unloading apparatus of this invention so that the loads can be moved directly onto the roller strings. The loads are now ready for loading. The stops are activated at each end. With reference to FIG. 3, the rightmost dog 78 is raised and the leftmost is lowered. Cylinder 66 is then expanded and contracted in continuous movements during which the rightmost dog 78 will intermittently engage the transverse elements 42 to advance the pair of roller strings. Prior to this operation, the pivotal portion 19 of the base will have been adjusted in height to compensate for the variances in height of the truck to the loading dock. Further, pivoted ramps 23 will have been swung downwardly to span the gap between the loading dock and the vehicle, as shown in FIG. 2.

After the load is entirely within the vehicle, the forwardmost stop is retracted and load restraining means are placed across the rear of the vehicle to engage the load. With reference to FIG. 3, the leftmost dog is raised and the rightmost is lowered and through continuous extension and retraction movements of the cylinders 66 the roller strings are intermittently retracted from the vehicle and from beneath the load. Due to the tapered leading edge of the leading section of the roller strings, the loads are gently lowered onto the load supporting stringers 22 or to a planar floor.

In the unload mode, a pair of roller strings for each row are intermittently jacked into the vehicle and are wedged beneath the load and as it continues to move, raises the load off of the static support beams 22. This wedging action, of course, is facilitated by the tapered leading edge 36a and by the roller surfaces. After reaching its full length of travel, the forwardmost stop is raised to engage the load on the opposite end thereof to prevent the row of loads from rolling off of the extensible element as the extensible element is retracted.

MODIFICATIONS

It is to be understood that while a particular drive means has been shown, other drive means can be readily employed. For example, it is within the of this invention to employ an endless cable drive mechanism having dogs thereon for engaging the underside of roller strings for advancing or retracting the roller strings. Further, any form of restraining means or stop means may be employed as long as they serve the purpose of restraining the loads, when it is desired to retract the roller strings and to prevent the load from falling off of the roller strings. FIGS. 14a and 14c show the loading and unloading apparatus of this invention mounted on a vehicle as opposed to a loading dock. The operation is substantially identical to that described for a dock mounted unit.

STATIC SUPPORT MEANS

As mentioned earlier, this can be accomplished in a number of ways. For example, this invention is operable with pallets or other loads having feet or stringers on the underside thereof. In the preferred embodiment, static loading beams are shown mounted in the vehicle or alternately on the loading dock for supporting flat-bottomed loads in spaced relationship to the floor. Variations of suitable static support beams are shown in FIGS. 15a through 15e.

Figures 15A, 15B:
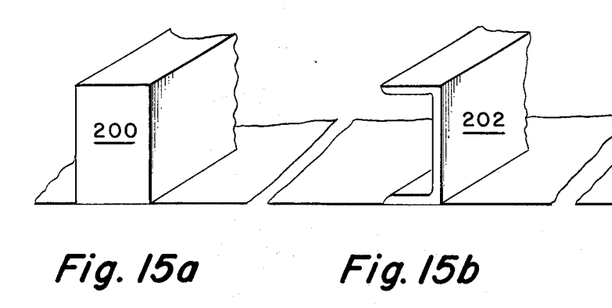
FIGS. 15a through 15e are perspective views of different embodiments of load static rests which may be positioned either in a vehicle or on a loading dock.
Figure 15C:
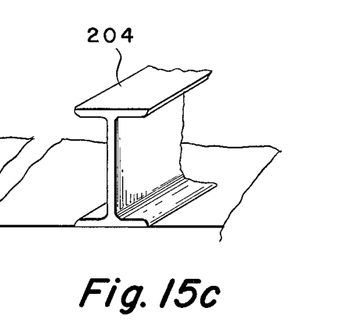
Figure 15D:
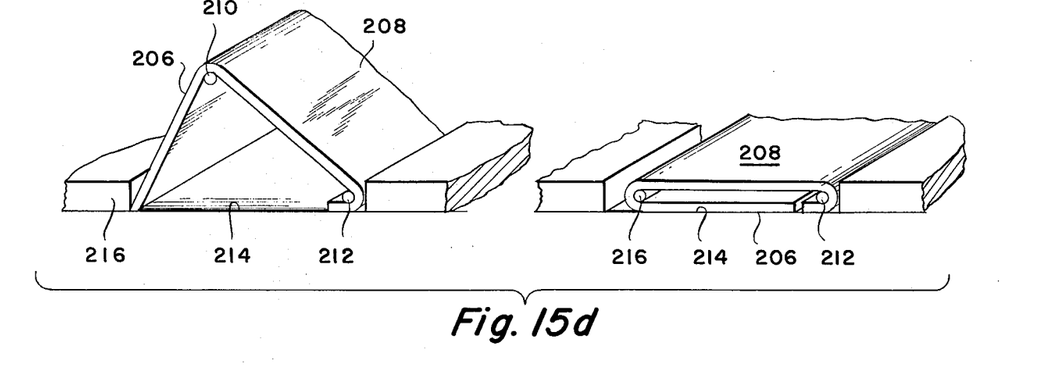
Figure 15E:
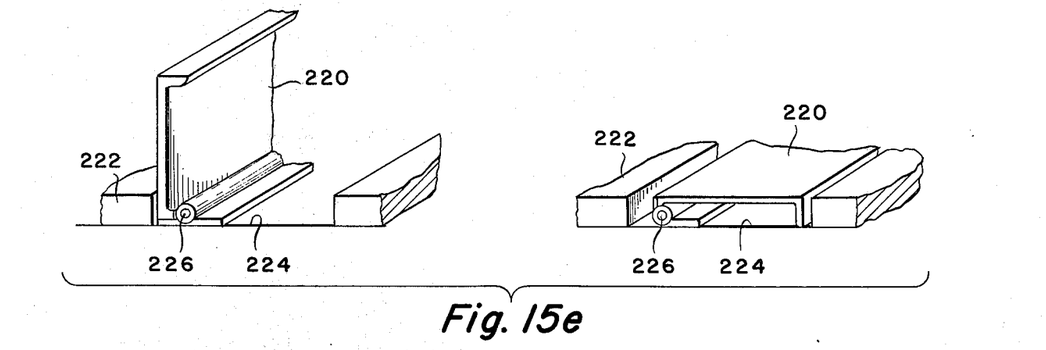

FIG. 15a shows an ordinary wooden beam 200, FIG. 15b shows a metal C-shaped channel bar 202 and FIG. 15c shows a metal I beam 204. FIGS. 15d and 15e show retractable static load-supporting beams which can be moved to an inoperative position flush with the floor of the vehicle or dock to provide a flush surface. This is desirable in areas where forklift trucks are periodically used.

The embodiment shown in FIG. 15d comprises two legs 206 and 208 pivotally connected to each other at 210. One end of the leg 208 is pivotally attached to the vehicle floor at 212 in a recess 214. The lengths of the legs and the pivot points are so positioned that the leg 206 may be swung outwardly and wedged against one of the side walls 216 of the recesses 214 to provide an upstanding static support as shown, but can readily be folded under the leg 208 to a fully nested position within the recess 214, to provide an unobstructed floor surface. FIG. 15e shows a channel beam 220 which is attached at one side to the floor 222 within a recess 224 at pivotal connection 226. The beam can be swung to the "up" position as shown to support a load or it can be swung to the down or inoperative position, wherein it is fully nested within the recess 224 to provide a substantially flush, unobstructed floor.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. Apparatus mounted on a loading dock for loading and unloading from vehicles loads supported in spaced relationship to the floor of the vehicle comprising an elongated base mounted on said dock, an elongated extensible element mounted on said base for movement in a longitudinal path relative to said base and into and out of a vehicle to be loaded or unloaded, reversible drive means operably connected to said base and said extensible element to effect said movement, said extensible element comprising a framework, load supporting rollers journaled in said framework, second rollers journaled in said framework and movably supporting said extensible member during said longitudinal movement, said extensible element being of greater height than the distance said load is spaced from said floor, a tapered leading edge on said extensible element whereby said extensible element can be wedged beneath said load as it is driven longitudinally into the vehicle, and means on said extensible element for preventing said load from moving off of said extensible element as said extensible element is moved out of said vehicle carrying said load therewith.

2. The apparatus of claim 1 wherein the framework of said extensible element is comprised of pivotally connected, longitudinally aligned sections.

3. The apparatus of claim 1 and including means to prevent said sections from buckling upwardly as said extensible element is wedged beneath the load.

4. The apparatus of claim 1 and including load restraining means whereby a load on said extensible element is restrained while said extensible element is retracted from beneath said load.

5. The apparatus of claim 1 and including height adjustment means for raising the end of said base adjacent said vehicle to compensate for variances in heights of vehicle floors relative to said dock.

6. The apparatus of claim 1 wherein said reversible drive means comprises a reciprocating power means connected to said base, oppositely facing dogs mounted on said power means and each movable between operative and inoperative positions, said dogs engaging said extensible element to drive said element intermittently in a longitudinal path upon actuation of said power means.

7. The apparatus of claim 1 wherein said load is supported in spaced relationship to said vehicle floor by collapsible stringers.

8. A load handling device for shifting loads normally supported in spaced relationship to a supporting surface from one position to another comprising,
   an elongated extensible element having a tapered leading edge, said extensible element being of greater height than the distance said load is spaced from said supporting surface,
   supporting surface engaging rollers journaled in said extensible element,
   means for moving said extensible element over said supporting surface in a rectilinear path,
   a low-friction surface on at least a portion of the upper surface of said extensible element, a means for restraining said load in one direction while said extensible element is wedged under said load to raise said load off of said supporting surface whereby said load is moved to another location by movement of said extensible element in the opposite direction, means on said extensible element for preventing said load from moving off of said extensible element as said extensible element is moved to another location carrying said load therewith, second restraining means cooperable with said framework for restraining said load in the opposite direction as said framework is withdrawn from beneath said load whereby said load is lowered to said supporting surface.

9. Apparatus mounted on a vehicle for loading and unloading said vehicle from loading docks when loads are supported in spaced relationship to the floor of said dock, comprising an elongated extensible element on said floor for movement in a longitudinal path relative to said floor to carry loads from within said vehicle to said dock and from said dock into said vehicle, reversible drive means operably connected to said vehicle and said extensible element to effect said movement, said extensible element comprising a framework, load supporting rollers journaled in said framework, second rollers journaled in said framework and movably supporting said extensible member during said longitudinal movement, said extensible element being of greater height than the distance said load is spaced from said floor, a tapered leading edge on said extensible element whereby said extensible element can be wedged beneath said load as it is driven longitudinally onto said dock, and means on said extensible element for preventing said load from moving off of said extensible element as said extensible element is moved from said dock and into said vehicle carrying said load therewith.

10. The apparatus of claim 9 wherein the framework of said extensible is comprised of pivotally connected, longitudinally aligned sections.

11. The apparatus of claim 9 and including means to prevent said sections from buckling upwardly as said extensible element is wedged beneath the load.

12. The apparatus of claim 9 and including load-restraining means whereby a load on said extensible element is restrained on said dock while said extensible element is retracted from beneath said load whereby said load is dropped to said dock.

13. The apparatus of claim 9 and including height adjustment means for raising the end of said base adjacent said dock to compensate for variances in heights of vehicle floors relative to said dock.

14. The apparatus of claim 9 wherein said load is supported in spaced relationship to said dock floor by collapsible stringers.

* * * * *